May 23, 1972  B. PENDERGRASS ETAL  3,664,717

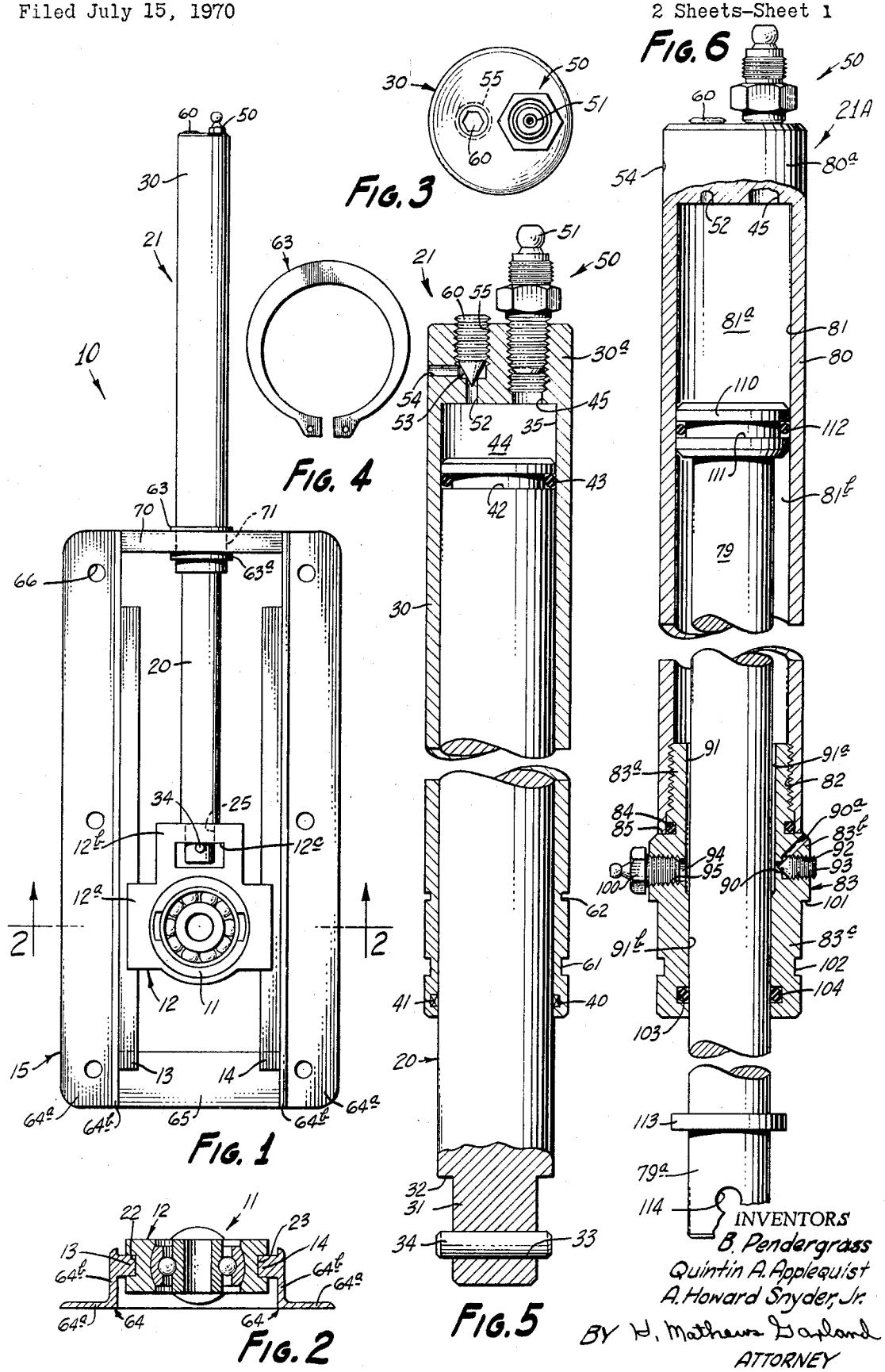

TAKEUP APPARATUS

Filed July 15, 1970

INVENTORS
B. Pendergrass
Quintin A. Applequist
A. Howard Snyder, Jr.

BY H. Matthew Darland
ATTORNEY

United States Patent Office 3,664,717
Patented May 23, 1972

3,664,717
TAKEUP APPARATUS
Buford Pendergrass, Wichita, and Quintin A. Applequist, Salina, Kans., and Alan H. Snyder, Jr., Dallas, Tex., assignors to Roberts Industries, Inc., Salina, Kans.
Filed July 15, 1970, Ser. No. 55,032
Int. Cl. F16c 35/02; F16h 7/08
U.S. Cl. 308—15                                    14 Claims

ABSTRACT OF THE DISCLOSURE

A takeup apparatus for adjustably supporting a bearing mounted pulley, sheave, sprocket, and the like for varying tension in a belt, chain, or similar flexible drive member. A bearing for supporting a shaft is mounted in a housing for longitudinal movement along a track in a frame. The bearing housing is connected with a piston rod of a hydraulic cylinder provided with a grease fitting and a bleed port. Grease is injected into the cylinder through the grease fitting by a grease gun to force the piston outwardly for moving the bearing to adjust belt tension. The tension may be relieved by manipulating a needle valve controlling escape of grease from the cylinder through the bleed port to allow the piston to move into the cylinder relaxing the belt tension. Alternate forms of the device include a double acting piston which may be forced in either direction for controlled relaxing or increasing belt tension. Another form includes hydraulic cylinder units mounted at opposite ends of the frame and connected with opposite ends of the bearing housing whereby the housing is forced in either direction by manipulation of the proper hydraulic cylinder. A further form of the apparatus includes a single acting cylinder with a spring return used for moving the bearing housing back toward the hydraulic cylinder for relaxing belt tension.

---

This invention relates to takeup devices and more particularly relates to hydraulically operated adjustable bearing mounts for controlling the belt and chain tension and the like.

In accordance with the invention a new and improved takeup device for adjusting belt and chain tension and the like includes a bearing supported in a bearing mount or housing which is moveable along tracks in a frame. In a preferred form of the device the bearing mount is connected with the outer end of a piston rod of a hydraulic cylinder unit secured at one end of the frame so that the bearing mount is moveable along the tracks to any desired location along its length by the piston rod. The cylinder includes a Zerk grease fitting and a pressure relief bleed passage through which flow is controlled by a needle valve. A grease gun is used to inject grease through the Zerk fitting into the cylinder for forcing the piston rod outwardly to move the track-mounted bearing for tensioning a belt, chain, or the like running over a pulley or sprocket on a shaft supported by the bearing. A positive, continuous, very accurately controllable force can be applied to the piston rod to obtain the desired tension. The hydraulic cylinder unit does not freeze due to corrosion or to lack of lubrication as a conventional threaded-shaft type takeup device. The unit is entirely self-contained and need not rely on an independent or separate source of hydraulic force, but rather is operable by a suitable conventional grease gun.

When relaxation of the tension is desired, the needle valve controlling the flow through the bleed passage is operated to allow the grease in the cylinder to be squeezed out and permit the piston rod to move in a tension relaxing direction.

Other forms of the device include a double acting hydraulic cylinder wherein grease may be injected into opposite ends to effect positive movement in either direction for increasing or decreasing tension. Still further forms of the device include hydraulic cylinders mounted at opposite ends of the frame connected by piston rods to opposite ends of the bearing mount and a single hydraulic piston with a spring return connected with the bearing mount.

The takeup device of the invention will be better understood by reading the following description of the device taken in conjunction with the accompanying drawings wherein:

FIG. 1 is a side view in elevation of a preferred form of takeup device embodying the invention;

FIG. 2 is a view in section of the bearing and mount along the line 2—2 of FIG. 1;

FIG. 3 is an enlarged end view of the hydraulic cylinder of the device of FIG. 1;

FIG. 4 is an enlarged view of a lock ring used for holding the hydraulic cylinder with the frame;

FIG. 5 is an enlarged longitudinal view, partly in section and partly in elevation of the hydraulic cylinder and piston assembly of the device of FIG. 1;

FIG. 6 is a view similar to FIG. 5 of an alternate form of a double acting hydraulic cylinder and piston assembly which may be used with the frame and mounted bearing shown in FIG. 1;

Figure 7:
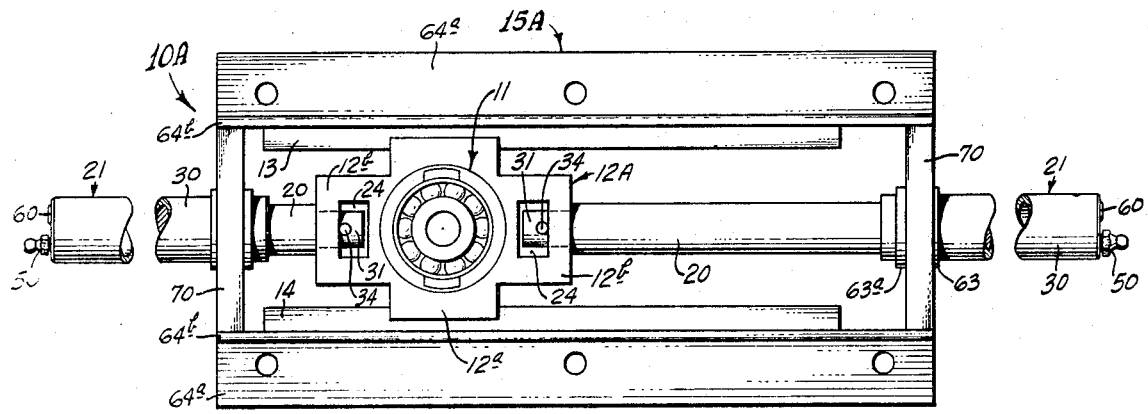
FIG. 7 is a side view in elevation of another form of takeup device embodying the invention utilizing two hydraulic cylinders for movement of the bearing in either direction.

Referring to FIG. 1 of the drawings a takeup device 10 embodying the invention includes a bearing 11 supported in a slidable bearing mount or housing 12 which is movable along spaced parallel tracks 13 and 14 provided within a rectangular frame 15. The bearing mount is secured with a piston rod 20 of a hydraulic piston-cylinder assembly or unit 21 supported at one end of the frame. A shaft with a pulley, sprocket, or other driven or driving member, not shown, may be supported in the bearing 11 for operation of a belt, a chain, or the like, the tension of which is controlled by the takeup device 10. The position of the bearing for adjusting such tension is controlled by the piston rod 20 responsive to hydraulic pressure within the cylinder 21.

Additional specific details of the takeup device 10 are illustrated in FIGS. 2–5. The bearing housing 12 has a main rectangular portion 12a which is provided along opposite side edges with longitudinal slots 22 and 23 which receive the frame tracks 13 and 14 for movement of the bearing mount along the frame. The bearing mount has a rectangular extension 12b formed at one end of the mount and provided with a lateral slot or window 24 which communicates with a bore 25 formed in the end of the extension along the axis of the mount for the connection of the piston rod 20.

The hydraulic assembly 21 includes the integral piston-rod 20 and a cylinder 30 in which the rod is slidable.

The piston rod has a reduced end portion 31 and a stop-shoulder 32 at the juncture of the portion 31 and the main body of the rod. A lateral bore 33 is formed in the end portion 31 to receive a lock pin 34, which extends through the bore and outwardly at opposite ends for holding the rod to the bearing mount 12. The reduced portion 31 of the piston rod is disposed through the bore 25 of the bearing mount with the piston rod shoulder 32 engaging the outer end face of the portion 12b of the bearing mount. The stop pin 34 is inserted in the window 24 through the bore 33 of the rod with the opposite end portions of the stop pin projecting outwardly from opposite sides of the piston rod reduced portion in the window 24. The exposed end portions of the stop pin engaged the inside surface 12c of the window 24 securing the piston rod to the bearing mount.

The cylinder 30 has a blind bore 34, which receives the piston rod. The open end of the cylinder has an internal recess 40 in which a wiper-type seal 41 is positioned to clean and protect the surface of the piston rod within the cylinder. The inward end of the piston rod 20 forms a piston which has an external annular recess 42 in which an O-ring 43 is engaged for sealing around the piston with the cylinder surface defining the bore 35 so that pressure is held in the variable grease chamber 44 of the cylinder defined by the bore 35 and the sealed inward end of the piston. The end portion 30a of the cylinder has an internally threaded bore 45 which communicates with the grease chamber 44. A Zerk grease fitting 50, having a grease gun connection 51, is threaded into the bore 45 for injection of grease under pressure through the fitting into the grease chamber. The grease fitting is a standard fitting having a valve, not shown, which permits injection of grease under pressure through the fitting into the grease chamber but will not permit the outward escape of the grease through the fitting from the chamber. The end portion 30a of the cylinder is also provided with a smaller bore 52 which opens into the grease chamber 44 spaced from the bore 45 and communicates with a valve chamber 53 which connects with a lateral bleed passage 54 in the head portion 30a. The valve chamber 53 also communicates with a threaded bore 55 in which a needle valve 60 is threaded for control of grease flow from the grease chamber 44 through the bore 52 into the valve chamber 53. In FIG. 5, the needle valve is screwed inwardly into the cylinder head until its conical inward end portion fully closes the bore 52. Retraction of the needle valve permits grease flow from the chamber 44 through the bore 52, the valve chamber 53, and outwardly through the passage 54.

The cylinder 30 has a pair of spaced external annular recesses 61 and 62, each to receive a lock ring such as the C-shaped ring 63 shown in FIG. 4 for securing the cylinder to the frame 15.

The frame 15 includes a pair of parallel spaced longitudinal angle members 64 each formed by a plate portion 64a and a plate portion 64b perpendicular to the portion 64a. The plate portions 64a of the two angle members lie in a common plane. At one end the angle members 64 are connected together by a plate member 65 which extends laterally between the angle members in the plane of the plate portions 64a. The plate portions 64a have mounting holes 66 for securing the frame to a support, not shown. At the opposite end of the frame, the upper end in FIG. 1, the angle members 64 are connected together by a member 70 which extends transverse between the angle member portions 64b in a plane perpendicular to the longitudinal axis of the frame. The member 70 is substantially thicker than plate member 65 to provide ample structural support for the hydraulic cylinder. The member 70 has a bore 71 formed on an axis at its center and coincident with the longitudinal centerline or axis of the frame 15 to receive the hydraulic cylinder 30 as shown in FIG. 1. The longitudinal tracks 13 and 14 are formed along the inside faces of the angle member portions 64b as shown in FIGS. 1 and 2. To provide a maximum length track within the frame, the tracks 13 and 14 somewhat overlap the cross-member 65, as seen in FIG. 1. The cross-member 65 is about the thickness of the angle member portions 64a and secured in the plane of such portions so that the bearing mount may move along the tracks to an end position somewhat overlapping the member 65.

The hydraulic cylinder 30 is assembled with and secured to the frame by inserting the open end portion of the cylinder through the bore 71 of the frame cross member 70. Lock rings 63a and 63 are engaged in the external cylinder recesses 61 and 62 at opposite faces of the frame member 70 securing the cylinder to the crossmember, as shown in FIG. 1. The lock ring 63a in the recess 61 is thicker because the force between the cylinder and frame is greatest toward the inside face of the frame member 70 when the rod 20 is pushing the bearing mount away from the member 70 in a tensioning direction.

In operation the takeup apparatus is connected in a system to support a pulley or sprocket engaged with a belt, a chain, or the like, the tension of which is adjusted by the device. The shaft of the pulley or sprocket, not shown, is mounted in the bearing 11, and the frame 15 is suitably mounted and aligned to allow the bearing and its mount to be moved by the hydraulic cylinder assembly in a direction toward the end of the frame at the plate member 65 for increasing the tension. The mounted bearing is moved along the tracks 13 and 14 by the piston rod 20, which is forced outwardly relative to the hydraulic cylinder by a fluid, such as grease, forced into the chamber 44 of the cylinder through the fitting 50. Initially, the needle valve 60 is opened slightly by retracting its valve end from the bore 52 to evacuate air from the chamber 44 as the grease is introduced to the chamber through the fitting 50. When the chamber is filled, with some grease bleeding from the chamber through the bore 52, the valve chamber 53, and the bleed passage 54, the needle valve 60 is closed. Additional grease is then forced through the grease fitting into the chamber 44 until the piston rod 20 is forced outwardly to obtain the desired belt or chain tension by moving the mounted bearing 11 along the tracks of the frame. Accurate control of the desired tension is obtained by injection of exactly the required amount of grease into the chamber. The O-ring 43 prevents escape of the grease along the piston from the chamber within the cylinder, while the wiper 41 prevents dirt from entering the chamber along the piston rod surface thus generally keeping the piston rod surface within the chamber clean as the rod is moved inwardly and outwardly.

When relaxation of the tensioned member is desired, the needle valve 60 is opened to allow escape of grease from the chamber 44 through the bore 52 and the bleed passage 54. The escape of the grease from the chamber and reduction of grease pressure within the chamber permits the bearing mount and bearing to move back toward the frame member 70 along the tracks with the piston rod moving back into the cylinder 30. The bearing mount may be moved manually when the force of the tensioned member ceases to move it.

The takeup apparatus shown in FIG. 1 may be modified to provide for positive controlled movement of the mounted bearing 11 in either direction along the tracks 13 and 14 by substitution of a hydraulic cylinder assembly 21A as shown in FIG. 6 for the cylinder assembly 21 illustrated in FIG. 1. The cylinder assembly 21A has a cylinder 80 provided with an open ended bore 81. Near its open end the cylinder 80 has internal threads 82. At its other end the cylinder has a head 80a provided with a fill bore 45 in which a Zerk fitting 50 is secured for forcing grease into the chamber portion 81a of the bore. The cylinder head has a bore 52 which communicates with a valve chamber 53 and a side bleed passage 54, neither of which are fully shown in FIG. 6, but which are exact in detail as shown in FIG. 5 in the head 30a of the cylinder 30. The needle valve 60 controls the flow from the chamber through the bleed passage.

A packing gland 83 is secured in the open end of the cylinder 80. The gland has a reduced threaded end portion 83a which engages the threads 82 and has an external annular recess 84 in which an O-ring 84 is held for sealing against leakage from the bore of the cylinder 80 around the gland. The gland has an enlarged central portion 83b which provides a shoulder 85 to limit the depth to which the gland may be threaded into the cylinder. The central portion of the gland has a lateral bleed port 90 which communicates with an annular space 91 around the piston rod and a bleed passage 91a permits communication into the annular cylinder chamber 81b. The port 90 also communicates with a threaded bore 92 which receives a needle valve 93 for controlling the flow of fluids from the chamber 81b. The gland 83 also has a fill port 94 along the portion 83b which open from the space 91 into an internally threaded bore 95 in which a Zerk fitting 100 is secured for injection of grease into the cylinder chamber 81b. The gland 83 has a reduced outer end portion 83c defining a stop shoulder 101 which functions in the securing of the cylinder assembly to the frame 15. Spaced from the stop shoulder 101, the closure member has an external annular recess 102 to receive a lock ring, such as the lock ring 63, for securing the gland to the frame. The gland has an internal annular recess 103 which receives an O-ring 104 for sealing around the piston rod as shown in FIG. 6.

The piston rod 79 has a piston 110 which slides within the hydraulic cylinder 80 dividing the cylinder into the variable grease chambers 81a and 81b depending upon the position of the piston. The piston has an external annular recess 111 in which an O-ring 112 is held for sealing within the cylinder around the piston. The reduced bore 91b of the gland 83, along its outward end portion, forms a tight sliding fit with the piston rod. The outward free end portion of the piston rod has an external annular stop flange 113 which engages the end face of the bearing mount 12 when the end portion 79a of the piston rod is inserted through the bore 25 of the bearing mount. The end portion of the piston rod has a lateral bore 114 for the lock pin 34.

The cylinder assembly 21A is connected with the frame 15 by inserting the reduced portion 83c of the gland 83 through the bore 71 of the frame end member 70. The shoulder 101 on the gland engages the outer end face of the member 70. A lock ring 63 is then inserted into the recess 102 to secure the cylinder 80 with the frame 15. The piston rod 79 is then connected with the bearing mount 12 by inserting the end portion 79a of the rod through the bearing mount bore 25 until the lateral bore 114 of the rod is within the bearing mount window 24. The lock pin 34 is engaged in the bore 114 to lock the piston rod with the bearing mount.

A takeup unit with the double acting hydraulic assembly 21A is used in situations where positive controllable bearing movement is desired in opposite directions, which may include controlled belt tensioning and relaxing, or other mechanical applications where controlled movement of a bearing supported shaft is desired along a straight line path of limited length. Initially each of the cylinder chambers 81a and 81b should be filled with grease in the manner prescribed above for the hydraulic assembly 21. The chamber 81a is filled by injecting the grease through the Zerk fitting 50 with the needle valve 60 being at an open position to evacuate the air from the chamber. Similarly, the chamber 81b is filled through the Zerk fitting 100 with the needle valve 93 being backed-off to an open position to allow air and grease to bleed from the chamber through the port 90 and the bleed passage 90a. The grease flows into the chamber 81b from the fill port 94 through the annular passage 91a around the piston rod within the gland 83. When the air is bled from each of the chambers and each is filled with grease, the piston is then adjusted to position the bearing mount 12 at the desired location along the frame tracks. Presuming for example, that movement of the housing toward the frame end member 65 is desired, the needle valve 93 is opened while grease is injected through the Zerk fitting 50 into the chamber 81a forcing the piston 110 and rod 79 downwardly as viewed in FIG. 6, with grease being forced from the chamber 81b through the bleed port 90. When the bearing housing has been moved the desired distance, the injection of grease into the chamber 81a is stopped and the needle valve 93 is closed. When bearing movement in the opposite direction toward the frame member 70 is desired, the needle valve 60 is opened to permit grease to flow from the chamber 81a through the bleed passage 52, while grease is injected through the Zerk fitting 100 into the cylinder chamber 81b until the bearing housing is at the desired location on the tracks. The bleed valve 60 is then closed so that both chambers of the cylinder remain filled with grease with the piston rod along with the bearing housing held at the desired position. Thus, so long as the bearing housing is held at a fixed position, grease remains sealed within both of the cylinder chambers; and when movement of the bearing housing is desired, grease is bled from the chamber in the direction of the movement, while grease is injected into the chamber away from the direction of the bearing housing movement. The use of the modified form of takeup unit using the double acting hydraulic assembly provides positive controlled movement of the bearing housing in either direction along a line of travel and positively locks the housing at the desired location on such line.

Figure 8:
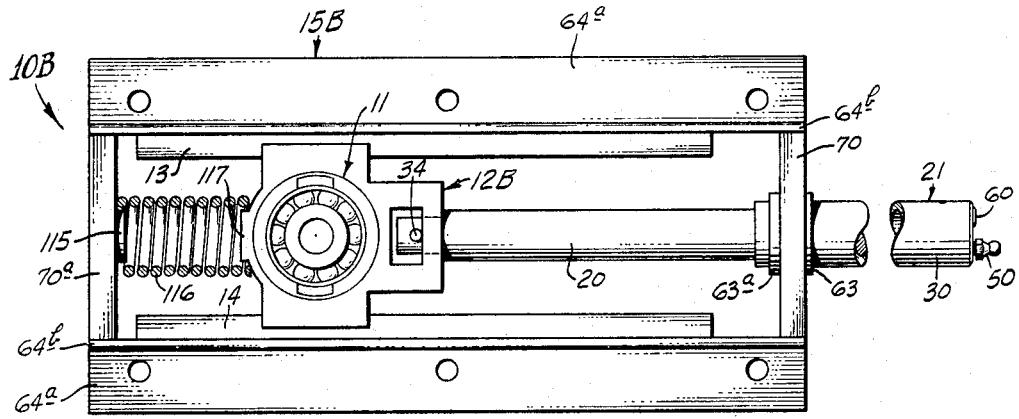
FIG. 8 is a side view in elevation of another form of takeup device embodying the invention utilizing a spring return with the mounted bearing.
Figure 9:
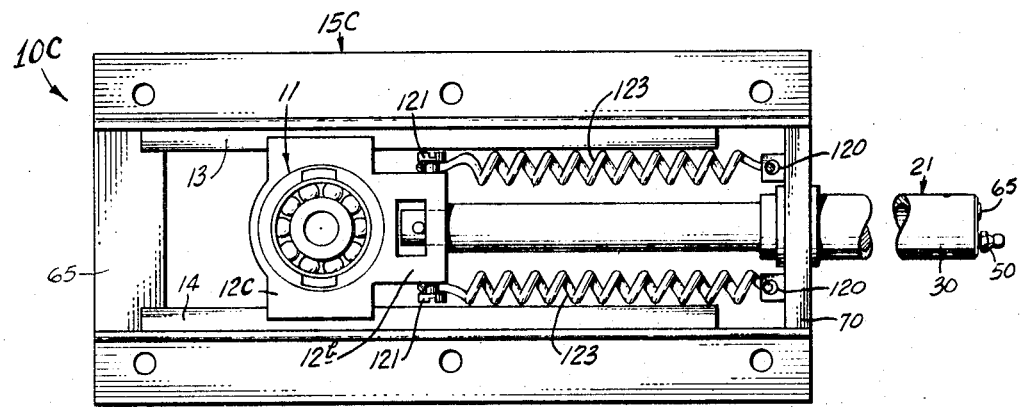
FIG. 9 is a side view in elevation of a still further form of spring return type of hydraulic takeup device embodying the invention.

Other forms of takeup units embodying the invention which provided for application of a positive force on the bearing housing unit in both directions are illustrated in FIGS. 7, 8 and 9. Referring to FIG. 7, a modified form 10A of the takeup unit includes a frame 15A, a bearing housing 12A, and a pair of identical cylinder assemblies 21 secured at opposite ends of the frame for driving the bearing housing in opposite directions along the frame. The frame 15A is identical to the frame 15 except that a heavier end member 70 is used at both ends of the frame 15A as distinguished from the use of the thin cross member 65 in the frame 15. The heavier cross member 70 is required in frame 15A because of the supporting of a cylinder assembly at each end of the frame. The bearing mount 12A has an end portion 12b at each of its opposite ends for the connection of a piston rod 20 at each end of the mount. The cylinder assemblies 21 are connected at the opposite ends of the frame 15A to the cross members 70 in exactly the same manner as described above in connection with the single hydraulic cylinder form of the unit 10. Similarly, the piston rods 20 of the unit 10A are connected in the same manner as already described with the opposite ends of the bearing mount 12A.

The takeup unit 10A is used to place the bearing housing 12A at a desired position along the length of the tracks 13 and 14 for belt tensioning or other purposes requiring adjustability of a bearing supported shaft. Initially, the cylinders of the unit 10A are filled with grease by the techniques previously described for injecting grease into the Zerk fitting 50 while bleeding air from the chamber 44 past the needle valve 60 until the chambers of each of the cylinder assemblies is filled with grease. To avoid wasting grease, it will be apparent that the bearing housing may be manually placed close to the desired location on the tracks with final adjustments being made by the cylinder assemblies. After the cylinder chambers are grease filled, the needle valve of the cylinder assembly toward which the bearing housing is to be moved is opened while grease is forced into the chamber of the cylinder assembly away from which bearing mount movement is desired. As the grease is forced into one chamber, the grease will be bled from the other chamber in the assembly toward which the bearing mount is moving. When the bearing is at the desired position along the tracks of the frame, the grease injection is stopped while the bleed valve in the other cylinder assembly is closed. Obviously, the bearing housing may be moved in either direction by proper manipulation of the bleed valves and grease injection until the desired position is obtained.

FIG. 8 shows a spring return type takeup unit which utilizes a hydraulic assembly to drive the bearing in one direction and a spring to return it in the opposite direction. The takeup unit 10B has a frame 15B with a bearing housing 12B and a hydraulic cylinder assembly 21. The frame 15B is like the frame 15A and includes a frame end cross member 70a at the end of the frame opposite the hydraulic cylinder assembly. The cross member 70a has a spring holder or guide 115 mounted on its inside surface at the center line of the member for holding the outward end of a bearing housing return spring 116. The bearing housing 12B has a spring holder 117 at the end of the housing facing the frame member 70a to hold and guide the spring 116 where it bears against the bearing housing. The takeup unit 10B is operated to position the bearing housing 12B at a desired location along the frame in the same manner as described in connnection with the unit 10, with grease being injected through the Zerk fitting 50 into the cylinder chamber and grease being allowed to bleed from the chamber past the needle valve 60. Of course, the total distance of travel of the bearing housing 12B is more limited in the unit 10B due to the presence of the return spring 116, which is compressed as the bearing housing is moved toward the spring. When tension release is desired, the needle valve 60 is open relieving the pressure within the hydraulic cylinder assembly so that the spring 116 expands moving the bearing housing 12B toward the cylinder assembly as the spring forces the housing along the frame tracks and inserts the piston rod further into the cylinder 30.

A still further form of spring return type of takeup unit 10C is ilustrated in FIG. 9. The takeup unit 10C includes a frame 15, a cylinder assembly 21, and a bearing housing 12C. The frame 15C is similar to the frame 15 and includes a pair of spring anchors 120 secured along the inside face of the frame end cross member 70 spaced on opposite sides of the cylinder assembly. The bearing housing 12C is similar to the bearing housing 12 and includes spring anchor bolts 121 along opposite edges of the bearing housing portion 12b. A pair of bearing housing return springs 123 are each connected between a spring anchor 120 on the spring cross member 70 and anchor bolt 21 in the bearing housing.

In the operation of the takeup unit 10C, the bearing housing 12C is moved along the frame tracks away from the cylinder assembly 21 by manipulation of the assembly in the same manner as described in connection with the units 10 and 10B. As the bearing housing is moved away from the cylinder assembly, the return springs 123 are placed under increasing tension. When the return of the bearing housing in the opposite direction toward the cylinder assembly is desired, the needle valve 65 is opened to allow grease to escape from the cylinder chamber as the stretched springs 123 contract pulling the bearing housing toward the springs.

It will be seen that a new and improved self contained, fluid operated, takeup unit has been described and illustrated for such applications as belt and chain tensioning. One form of the unit has a single acting cylinder assembly while other forms of the unit use a double acting cylinder assembly, two cylinders, and spring returns, respectively. In each of the forms of the unit disclosed, the bearing housing is positively moved to a desired location along a frame track by injection of fluid, preferably grease, into the cylinder assembly so that positive, accurate, control is obtained. The bearing housing may be adjusted to any position along the length of the track at which it is held by structure which is not affected by dirt, water, or weather conditions. Since the driving mechanism of the takeup unit is enclosed and protected and preferably operated by injected grease, the freezing of the unit due to corrosion and environmental dirt and other foreign matter is minimized, if not eliminated. The only tool required to operate the unit is a wrench or screwdriver to adjust the needle valve of the piston assembly and a grease gun for the injection of grease into the cylinder chamber of the piston assembly.

What is claimed and is desired to be secured by Letters Patent is:

1. A takeup unit for positioning and locking a bearing mounted shaft at a desired location comprising:
   a frame comprising two spaced parallel longitudinal angle members having first plate portions lying in spaced parallel planes and second plate portions lying perpendicular to said first plate portions and within a common plane, said second plate portions having means for removably mounting said frame, said first plate portions each having an elongated track formed along the inner face thereof thereby providing within said frame parallel spaced tracks, a first connecting cross member at one end of said frame between and secured with said angle members and perpendicular thereto, and a second cross member at the opposite end of said frame connecting with and perpendicular to said angle members;
   a bearing housing movably supported in said frame for movement along said track means, said bearing housing comprising a body member having outwardly opening longitudinal slots along opposite side edges of said body, said slots extending parallel with each other and spaced to receive said longitudinal tracks of said frame for slidably mounting said bearing housing within said frame for movement along the length of said frame on said tracks; and
   a piston assembly having a cylinder connected at a first end with and opening through one of said cross members of said frame, said cylinder extending outwardly and away from said frame along a line substantially parallel with and equidistant from said spaced angle members, a piston rod slidably disposed in said cylinder and having a free end extending within said frame between said tracks to and connected with said bearing housing body for moving said housing within said frame along said tracks, said cylinder having a grease fitting for injection of grease into said cylinder with a grease gun and a bleed valve for release of grease from said cylinder.

2. A takeup unit in accordance with claim 1 including a bearing for rotatably supporting a shaft connected in said bearing housing.

3. A takeup unit in accordane with claim 2 wherein said piston assembly is single acting for displacing said bearing housing in one direction along said track means.

4. A takeup unit in accordance with claim 2, wherein said piston assembly is double acting having pressure chambers in said cylinder on opposite sides of a piston therein connected with said piston rod and grease injection and bleed valve means connected with said cylinder communicating with said chambers in said cylinder for positively forcing said piston and piston rod in either of opposite directions by injection of grease into one of said chambers while bleeding grease from the other of said chambers for moving said piston rod in either of said directions for moving said bearing housing along said track in either of opposite directions along said track means.

5. A takeup unit in accordance with claim 2, including a piston assembly connected at each end of said frame, each of said piston assemblies having a piston rod connected with said bearing housing whereby said housing is connected at opposite ends with a piston rod for movement of said bearing housing in either of opposite directions along said track means by one of said piston assemblies.

6. A takeup unit in accordance with claim 2 including a piston assembly supported at one end of said frame having a piston rod connected with one end of said bearing housing and a spring connected with the other end of said bearing housing and the other end of said frame, whereby said bearing housing is moved in a first direction away from said piston assembly toward said spring by said piston assembly compressing said spring and is returned in the opposite direction away from said spring by release of pressure in said piston assembly and expansion of said spring.

7. A takeup unit in accordance with claim 2 including a piston assembly secured with a first end of said frame having a piston rod connected with a first end of said bearing housing for moving said bearing housing by said piston rod in a direction away from said piston assembly and spring means connected between said first end of said frame and said first end of said bearing housing for returning said bearing housing toward first end of said frame by contraction of said spring when pressure in said piston assembly is relieved.

8. A takeup unit for positioning a bearing housing at a desired location comprising:

an open rectangular frame including spaced parallel angle members having first parallel plate portions in spaced parallel planes and second plate portions perpendicular to said first plate portions and lying in a common plane, said second plate portions having holes therethrough for mounting said frame by bolt means, said second plate portions extending outwardly from each other on opposite outwardly facing sides of said first plate portions, and a longitudinal track portion formed along the inner face of each of said first plate portions of said angle members extending a major portion of the length of said angle members, said frame having a cross member at each end thereof extending perpendicular with said angle members and connecting the ends of said angle members together whereby said frame is a rectangular open structure;

a bearing housing having outwardly facing parallel spaced slots each of said slots receiving one of said tracks whereby said housing is movable in said frame between said tracks along the length of said tracks;

bearing means mounted in said housing;

means at a first end of said bearing housing for connection of a piston rod thereto;

a piston assembly connected with one of said cross members of said frame at a first end of said frame, the longitudinal axis of said piston assembly being aligned with the longitudinal axis of said frame;

said piston assembly having a piston rod connected at an outward end thereof with said connecting means of said bearing housing for moving said housing along said tracks responsive to said piston rod;

said piston assembly including a cylinder secured at a first end through said cross member at first end of said frame and having a grease chamber whereby said piston rod is movable responsive to pressure in said grease chamber;

said piston assembly having a grease connection and a bleed valve communicating with said chamber for injection of grease into said chamber from a grease gun and for bleeding grease from said chamber to release the pressure therein; and a piston connected with said piston rod movable in said cylinder responsive to pressure in said chamber of said piston assembly.

9. A takeup unit in accordance with claim 8 wherein said piston assembly is double acting and includes a piston dividing said cylinder into two pressure chambers, one on each side of said piston, and including a grease fitting and a bleed valve connected with said cylinder into each of said chambers for injecting grease into and ejecting grease from each of said chambers whereby said piston rod is movable in opposite directions responsive to injection of grease into one of said chambers while bleeding grease from the other of said chambers.

10. A takeup unit in accordance with claim 8 including a piston assembly connected with a second end of said frame, said piston assembly having a piston rod secured with piston rod connecting means on the other end of said bearing housing, said piston assembly having a cylinder providing a pressure chamber housing a piston connected with said piston rod; said cylinder having a grease injection valve and a bleed valve for injecting grease into said chamber and for bleeding grease from said chamber; said bearing housing being movable in a first direction by injection of grease into a first of said piston assemblies while bleeding grease from the second of said piston assemblies and said bearing being movable in the other direction by injection of grease into the second of said piston assemblies while bleeding grease from first of said piston assemblies.

11. A takeup unit in accordance with claim 8 including a spring connected with said frame between the second end of said frame and the second end of said bearing housing, said spring being compressed when said housing is moved toward the said spring by injection of grease into said piston assembly and said spring expanding to move said bearing housing back toward said piston assembly when the grease pressure in said piston assembly is relieved.

12. A takeup unit in accordance with claim 8 including a pair of springs connected in spaced relation on opposite sides of said piston rod between said first end of said frame and said first end of said bearing housing for returning said bearing housing toward said first end of said frame, said springs being extended in tension when said bearing housing is moved away from said first end of said frame by said piston assembly and said springs contracting to move said bearing housing back toward said first end of said frame responsive to relief of pressure in said piston assembly.

13. A takeup unit for positioning and locking a bearing mounted shaft at a desired location comprising:

an open rectangular support frame including first and second substantially parallel frame members, said first and second frame members having mounting means for removably securing said takeup unit with apparatus operative with and adjusted by said bearing mounted shaft, said first and second frame members having means defining a track for supporting a housing for a bearing for said shaft for movement of said housing along a linear path within said frame, including third and fourth cross members secured between and at opposite ends of said first and second members and substantially perpendicular thereto;

a bearing housing movably supported in said frame along said track means provided by said first and second frame members, said housing comprising a body member having outwardly opening longitudinal slots along opposite sides of said body extending substantially parallel with each other and spaced to receive said track means provided along said first and second frame members for slidably mounting said bearing housing within said frame for movement along and within said frame; and a piston assembly having a cylinder connected at a first open end through one of said cross members of said frame, said cylinder being disposed outwardly from said frame along a line substantially parallel with and equidistant from said first and second frame members, a piston rod slidably disposed in said cylinder having a free end extending within said frame between said first and second frame members and connected with said bearing housing body member for driving said bearing housing within said frame along said linear path, said cylinder having a grease fitting along a second closed end portion for injection of grease into said cylinder with a grease gun and a bleed valve for release of grease from said cylinder.

14. A takeup unit in accordance with claim 13 wherein said track means provided by said first and second frame members whereby said unit is readily assembled and dising housing is removable therefrom and said piston assembly is releasably connected with said bearing housing and said cross member between said first and second frame members whereby said unit is readily assembled and disassembled for part repair and replacement.

References Cited

UNITED STATES PATENTS

| | | | |
|---|---|---|---|
| 3,082,043 | 3/1963 | Orton | 74—242.14 |
| 3,444,750 | 5/1969 | Stuller | 74—242.14 |
| 2,196,892 | 4/1940 | Berndt | 74—242.13 |
| 2,564,090 | 8/1951 | Ziemann | 74—242.13 |
| 2,491,011 | 12/1949 | Michell | 308—3 X |
| 1,663,344 | 3/1928 | Lennard | 74—242.14 |
| 3,140,076 | 7/1964 | Steadman | 254—93 |
| 3,477,766 | 11/1969 | Linsay | 74—242.14 |
| 3,549,213 | 12/1970 | Smith et al. | 74—242.14 |

MARTIN P. SCHWADRON, Primary Examiner

B. GROSSMAN, Assistant Examiner

U.S. Cl. X.R.

74—242.14

UNITED STATES PATENT OFFICE
CERTIFICATE OF CORRECTION

Patent No. 3,664,717            Dated May 23, 1972

Inventor(s) Buford Pendergrass, Quintin A. Applequist, Alan H. Snyder

It is certified that error appears in the above-identified patent and that said Letters Patent are hereby corrected as shown below:

Column 10, line 44, insert -- said frame -- before "including".
           line 74, cancel "whereby said unit is readily assembled and dis-" and insert -- is open in at least one end whereby said bear- --.

Signed and Sealed this

Eighteenth Day of January 1977

[SEAL]

Attest:

RUTH C. MASON
*Attesting Officer*

C. MARSHALL DANN
*Commissioner of Patents and Trademarks*